UNITED STATES PATENT OFFICE.

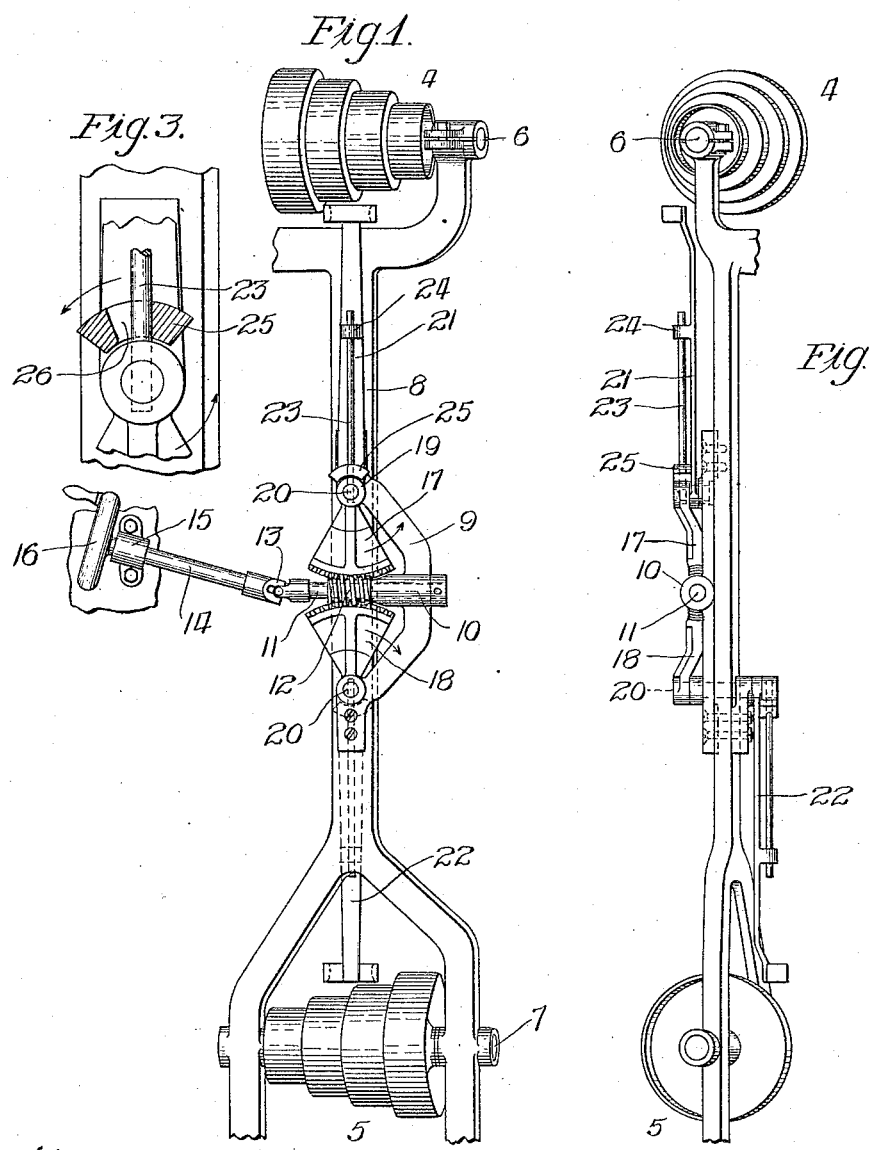

EVERETTE K. MORGAN, OF ROCKFORD, ILLINOIS, ASSIGNOR TO ROCKFORD DRILLING MACHINE COMPANY, OF ROCKFORD, ILLINOIS, A CORPORATION OF ILLINOIS.

BELT-SHIFTER.

1,184,481.                     Specification of Letters Patent.     Patented May 23, 1916.

Application filed November 5, 1915. Serial No. 59,806.

*To all whom it may concern:*

Be it known that I, EVERETTE K. MORGAN, a citizen of the United States, residing at Rockford, in the county of Winnebago and State of Illinois, have invented certain new and useful Improvements in Belt-Shifters, of which the following is a specification.

This invention is designed for use primarily in connection with stepped cone pulleys; and the object of the invention is to automatically shift the belt step by step on each of two companion pulleys, and to make adequate provision for initially securing the necessary slack by partially stepping down the belt at one end before bringing the companion shifting lever into position to step the belt up at the other end. In other words, the companion shifting levers automatically act in succession, rather than simultaneously, to effect each shifting movement.

The mechanism of the present invention is designed to easily and automatically effect the results above noted, and to afford a safe and convenient mechanism which can be operated by hand from any convenient position.

The invention further consists in the features of construction and combination of parts hereinafter described and claimed.

In the drawings: Figure 1 is a side elevation of the shifter of the present invention; Fig. 2 is an edge elevation thereof; and Fig. 3 is an enlarged detail partly in section, showing the mountings for one of the worm segments and its associated shifting lever.

The shifter of the present invention is employed in connection with a pair of companion reversely arranged stepped pulleys 4 and 5, which, as shown, are mounted respectively upon an upper shaft 6 and a lower shaft 7, suitably journaled at the opposite ends of a bracket frame 8, which may be a portion of the frame of a machine, or any other suitable and convenient mounting which serves to hold the stepped pulleys in spaced relation to one another.

The bracket frame, as shown, is provided in its center with a laterally extending arch 9, provided at its center with a journal bearing 10 which receives the end of a worm shaft 11 carrying a worm 12, which extends transversely of the bracket frame 8, and at a slight angle of, say, fifteen degrees with relation to the plane of the frame and of the journals for the stepped pulleys. This angularity of the parts is desirable in order that the ends of the shifting levers may move in parallelism with the stepped surfaces of the pulleys, which they would not do if arranged in parallelism with the pulley shafts.

The worm 11 is connected, by means of a universal joint 13, with an adjusting shaft 14, suitably mounted at its outer end in a bearing 15, and terminating in a hand wheel 16 located within convenient reach of the operator. It will be understood that the mountings for the operating parts may be arranged to conform to the requirements of the particular machine to which the belt shifter is applied.

The worm 11 meshes with a pair of oppositely disposed upper and lower worm segments 17 and 18 respectively, each of which terminates in a hub 19 keyed to a stub shaft 20, journaled within and outwardly projecting from the ends of the arched bracket 9, or otherwise mounted on the frame structure. The stub shafts 20 also serve as pivotal mountings for an upper shifting arm 21 and a lower shifting arm 22, the former mounted to move across the front side of the bracket frame, and the latter mounted to move across the rear side of the bracket frame. The arrangement will be readily understood by reference to Fig. 2, which indicates that the lower stub shaft 20 is extended to the rear side of the bracket frame to receive the lower shifting arm 22 on that side of the frame, rather than on the front side, as is the case with the upper shifting arm.

Each of the segment hubs is keyed to its stub shaft by means of a flexible spring bar 23, the lower end of which passes through the segment hub and through the shaft, and the upper end of which is slidably and loosely mounted in a lug 24 outwardly projecting from the face of the adjacent shifting arm, the arrangement being one which permits the segment to be moved and the spring bar flexed without initially imparting any movement to the shifting arm.

In order to transmit movement from the spring bar to the arm, a slotted lug 25 is formed on the shifting arm near its inner end. Each of the shifting arms is provided with a similar slotted lug, the slotting being proportioned to afford sufficient lost motion to permit the down-stepping arm to partially shift its end of the belt before the up-stepping arm begins to act, to the end that sufficient slack may be secured in the belt to permit the up-stepping operation to begin. As shown in Fig. 3, for instance, it will be noted that the slot 26 is open to the left of the upper spring bar 23, which will afford to the bar a considerable degree of flexation before the parts are brought into contact, allowing the up-stepping of the upper end of the belt to initially begin under spring tension of the flexible bar 23. Meanwhile, the reverse arrangement of the slot which coacts with the lower spring bar insures an immediate movement of the shifting of the shifting arm coincident with the initial movement of the lower segment, so that the down-stepping of the belt on the lower pulley will precede the up-stepping of the belt on the upper pulley.

When it is desired to reverse the stepping movements of the belt, a reverse movement of the adjusting wheel will insure an initial down-stepping of the upper end of the pulley in advance of an up-stepping of the lower end. These movements are assured by reason of the fact that some initial lost motion is afforded by the slot, so that the first movement imparted to the up-stepping shifting arm will be occasioned by the spring pressure of the previously flexed bar before the end of the slot in the inner lug is encountered. This positive contact serves to impart the ultimate positive thrust which in some cases may be necessary to lift the belt to the next higher step, but after the belt has been so lifted the spring tension to which the bar has been previously subjected will cause the shifting arm to move over until the spring bar has straightened itself and the parts again occupy the relation shown in Fig. 3. If, then, a down-stepping movement of the upper shifting bar to the right be effected by the adjusting wheel, this movement will begin at once, in view of the fact that the spring bar will be initially in contact with the right hand end of the slot.

It will be understood, of course, that the slotting of the lug on the lower shifting arm is complementary to that shown in Fig. 3, so that further description of this feature is deemed unnecessary.

From the foregoing description it will be seen that the up-stepping of the belt will be effected under spring action, and that no positive movement will be imparted until ample slack has been afforded to avoid any possible difficulty. In cases, however, where sufficient slack is given prior to actual contact between the spring bar and the end of the slot, the up-stepping operation may be completely effected by the increasing flexation of the spring bar, and without the necessity for imparting a positive movement to the parts. The arrangement is one which proportions the degree of lost motion to the slack afforded, up-steps the belt wholly or partially under spring tension, and ultimately restores the parts to normal relation after the shifting is complete and in position to reversely shift the belt in conformity with the same principle, as occasion may require. The arrangement is one which acts to afford an immediate and positive downshifting of the belt to afford the necessary slack, and a complementary deferred upshifting of the belt under tension. This renders the device fool-proof and secures an automatic adjustment of the parts to the conditions encountered.

I claim:

1. In belt shifting mechanism, in combination with reversely arranged cone pulleys, a shifting arm for each pulley, adjusting mechanism common to both arms, means for transmitting movement from the adjusting mechanism to each of the arms, and a connection between each of said means and its arm for imparting to said arm a positive and immediate movement when moved in a down-stepping direction, and a deferred spring action when moved in an up-stepping direction, substantially as described.

2. In belt shifting mechanism, in combination with reversely arranged cone pulleys, a shifting arm for each pulley, adjusting mechanism common to both arms, means for transmitting movement from the adjusting mechanism to each of the arms, a spring bar connected and movable with each of said transmitting means, and a loose connection between said spring bar and its arm for insuring an immediate and positive movement to the arm when moved in an up-stepping direction, and a deferred spring movement when moved in a down-stepping direction, substantially as described.

3. In belt shifting mechanism, in combination with a cone pulley, a shifting arm moving in suitable relation thereto, means for transmitting movements to said arm, and a spring connection between said transmitting means and said arm, adapted to impart an immediate positive movement to the arm in a down-stepping direction, and a deferred spring movement to the arm in an up-stepping direction, substantially as described.

4. In belt shifting mechanism, in combination with a cone pulley, a pivoted shifting arm movable in suitable relation to the pulley, a member pivoted to the pivotal mounting for the arm, and a spring connection between the arm and said member, adapted to positively contact a portion of said arm when moved in a down-stepping direction, and adapted to impart a movement under spring tension to said arm when moved in an up-stepping direction, substantially as described.

5. In belt shifting mechanism, in combination with a cone pulley, a pivoted shifting arm movable in suitable relation to the pulley, a member pivoted to the pivotal mounting for the arm, and a spring connection between the arm and said member, adapted to positively contact a portion of said arm when moved in a down-stepping direction, and adapted to impart a movement under spring tension to said arm when moved in an up-stepping direction, and a stop for limiting the up-stepping spring movement of said spring connection, substantially as described.

6. In belt shifting mechanism, in combination with a cone pulley, a shifting arm pivoted to move in suitable relation to the pulley, a power transmitting member pivoted concentrically with said arm, a spring bar carried by and movable with said power transmitting member, and stops on said arm positioned to afford immediate contact with said spring bar when moving in a down-stepping direction, and to afford deferred contact with said spring bar when moving in an up-stepping direction to permit the belt to be up-stepped under spring tension, substantially as described.

7. In belt shifting mechanism, in combination with a cone pulley, a shifting arm pivoted to move in suitable relation to the pulley, a power transmitting member pivoted concentrically with said arm, a spring bar carried by and movable with said power transmitting member, stops on said arm positioned to afford immediate contact with said spring bar when moving in a down-stepping direction, and to afford deferred contact with said spring bar when moving in an up-stepping direction to permit the belt to be up-stepped under spring tension, a complementary reversely arranged cone pulley, complementary shifting mechanism identical with that heretofore described, and an adjusting mechanism common to the two shifting mechanisms for simultaneously moving the power transmitting members to afford an immediate down-stepping of the belt at one end, and a deferred up-stepping of the belt at the opposite end, substantially as described.

8. In belt shifting mechanism, in combination with reversely arranged complementary cone pulleys, a pair of shifting arms pivotally mounted at their inner ends, a pair of segments mounted concentrically with the respective shifting arms, a spring bar outwardly extending from each of the segments, stops on each of the arms for positively and initially engaging the spring bar when moving in a down-stepping direction, and affording a deferred contact for the bar when moving in an up-stepping direction, and an adjusting worm in mesh with both of the segments for imparting simultaneous movement to said segments, and means for rotating said worm, substantially as described.

9. In belt shifting mechanism, in combination with a cone pulley, a shifting arm pivoted to move in suitable relation thereto, a power transmitting member pivoted concentrically with said arm, a spring bar connected and movable with and outwardly extending from said power transmitting member, a member on the shifting arm for loosely and slidably holding the outer end of the spring bar, and steps near the inner end of the shifting arm arranged to afford an initial contact for the spring bar when moving in a down-stepping direction, and to afford a deferred contact for said arm when moving in an up-stepping direction by the spring tension due to the flexation of the spring bar, substantially as described.

10. In belt shifting mechanism, in combination with a cone pulley, a shifting arm pivoted to move in suitable relation thereto, a power transmitting member pivoted concentrically with said arm, a spring bar connected and movable with and outwardly extending from said power transmitting member, and a member on the shifting arm for loosely and slidably holding the outer end of the spring bar for moving the arm under the spring tension of the bar, substantially as described.

EVERETTE K. MORGAN.

Witnesses:
 GERTRUDE ERICKSON,
 ADA M. FITZSIMMONS.

Copies of this patent may be obtained for five cents each, by addressing the "Commissioner of Patents, Washington, D. C."